Oct. 23, 1934.     O. A. KNOPP     1,977,854
GAS VALVE CONTROL SYSTEM.
Filed Dec. 10, 1930     2 Sheets-Sheet 1
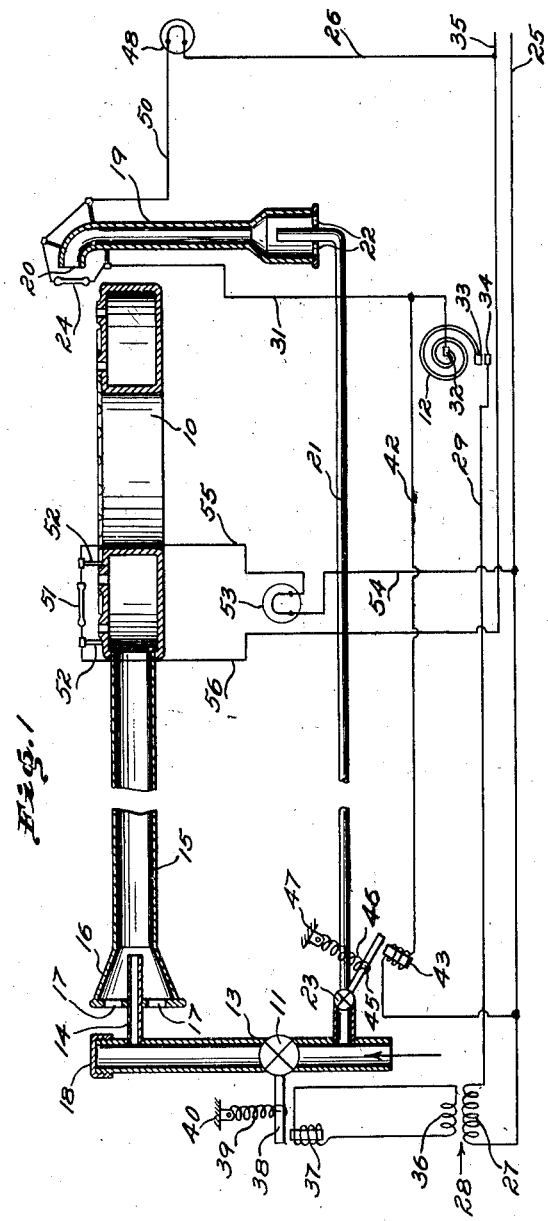
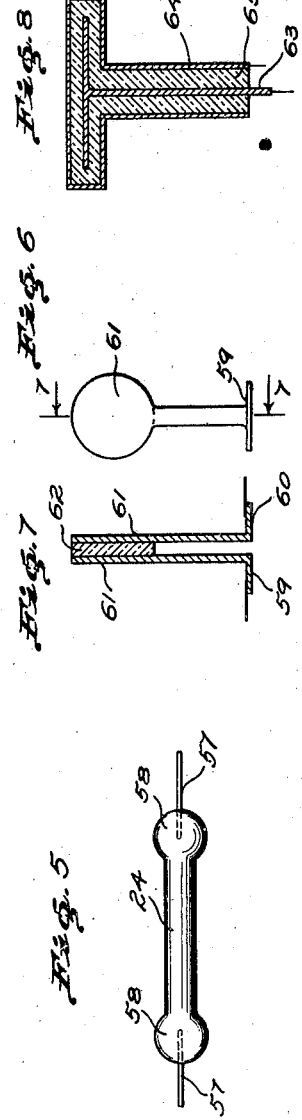
Inventor
Otto A. Knopp
by John Flam
Attorney

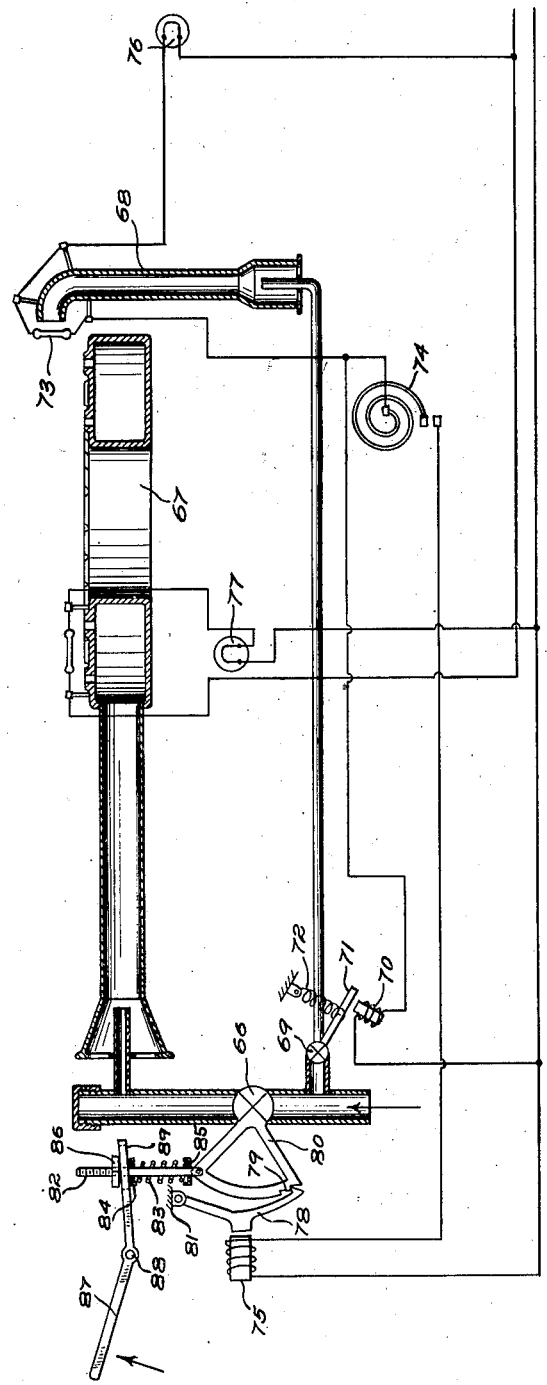

Patented Oct. 23, 1934

1,977,854

UNITED STATES PATENT OFFICE 1,977,854

GAS VALVE CONTROL SYSTEM

Otto A. Knopp, Oakland, Calif.

Application December 10, 1930, Serial No. 501,314

3 Claims. (Cl. 158—117.1)

This invention relates to control circuits, and especially to circuits that operate in response to temperature variations, as in a room. Although not limited thereto, such circuits find application in connection with the control of fuel burners, with which are used pilot lights for igniting fuel as soon as it reaches the burner.

It may happen that the pilot light is extinguished, and when the fuel is turned on, either manually or automatically, the fuel is left unignited, with possibilities of serious damage resulting from the accumulation of the explosive mixture. It has been proposed in the past to provide a temperature control such that the heat of the pilot flame affects a control circuit, so that when heating is absent, the main fuel valve cannot be operated.

Such a system has inherent disadvantages, which it is my purpose to obviate. In such thermostatic controls as used heretofore, contacts are provided which are exposed to intense heat and therefore rapidly deteriorate. Furthermore, even if the pilot light be extinguished, the stored heat in the burner chamber is sufficient to keep the thermostat operating for a long time thereafter.

It is therefore an object of this invention to provide a device which obviates the disadvantageous features of the prior art, and which can be conveniently installed in a circuit for controlling the operation of the gas valve. I accomplish this result by providing a heat control that eliminates the use of moving parts, such as the contacts of the thermostat, and that must be directly heated by the pilot light flame to permit the main fuel gas valve to be turned on.

These requirements are admirably met by ceramic resistances which have the peculiar property of being substantially non-conductive at temperatures less than red or cherry heat, but which have a much greater degree of conductivity at and beyond red or cherry heat. This type of conductor is well known and has been long used for other purposes.

It is accordingly another object of my invention to provide a heat control system in which the controlling element is formed by a device of this character.

Such a control system is useful in many other applications besides pilot light controls. For example, in the case of a manually controlled fuel valve, there is always danger that the fuel at the burner will be ignited only after the burner chamber is filled with an explosive mixture. This may lead to an explosion resulting in serious consequences. By providing a conductor of the class referred to, which can be affected by the match or fagot used to light the burner, there is a constant assurance against ignition of the fuel after accumulation thereof in the burner. It is therefore a further object of this invention to provide a control system whereby the fuel is ignited simultaneously with the entry thereof into the burner.

It is a further object of this invention to provide a ceramic heat valve that can be formed into any convenient shape, and which can be very readily incorporated in an electric circuit for the purpose specified.

It is a further object of this invention to incorporate with a heat control circuit including a ceramic heat control, a signal lamp which can be conveniently positioned to indicate whether or not the pilot light is burning. It is also possible to include an additional lamp in the circuit which would indicate whether or not the main burner is burning.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a diagrammatic view partly in section of an electrically operated heat valve for a gas burner embodying my invention;

Fig. 2 is a view similar to Fig. 1, but showing the application of my invention to a mechanically operated valve. In this figure, the valve is shown in the closed position;

Figs. 3 and 4 are detailed views of the operation of the valve showing the intermediate and open positions thereof;

Fig. 5 is an elevational view of an electric heat valve embodying my invention;

Fig. 6 is a side view of a modified form;

Fig. 7 is a section thereof along the plane 7—7 of Fig. 6; and

Fig. 8 is a section of another modified form.

In Fig. 1 there is illustrated a gas burner 10 to which gas is supplied from any convenient source through the medium of a valve 11. The operation of this valve is arranged to be controlled electrically by means of a thermostat 12, of bimetallic material, in response to temperature variations in a manner to be hereinafter described.

Gas from a source (not shown) is fed in the direction of the arrow through an inlet conduit in which valve 11 is arranged to be electrically operated in a manner to be described. A conduit 14 connects the inlet 13 with conduit 15 leading to the gas burner 10. The gas burner can be fashioned in any suitable form, and as shown, is a conventional burner used for heating purposes.

The outer end 16 of the conduit 15 is flared outwardly and can be provided with adjustable air inlet passages 17 for the admission of air. This air mixes with the incoming gas to form a combustible mixture which can readily burn in burner 10. A removable cap or cover 18 is screw threaded onto the upper end of the inlet conduit 13.

A pilot burner 19 is arranged adjacent the burner 10 so that a pilot flame issuing from the orifice 20 will play over the burner and ignite the combustible mixture issuing therefrom in a manner to be described. Gas is supplied to the pilot burner 19 through the medium of a conduit 21 leading from the inlet conduit 13 to the lower interior of the pilot burner. This burner is also provided with air inlets 22 whereby a combustible mixture can be formed in the burner. A valve 23, shown in this instance as electrically operated, is arranged in the conduit 21 which is operated in a manner to be hereinafter described to supply gas to the pilot burner 19.

Valve 11 is electrically operated in a manner now to be described.

A ceramic resistor 24 is connected in series with an electrical circuit leading from a suitable source of supply. This circuit can be traced as follows: Current from the source of supply (not shown) flows to main 35, through lead 26, pilot lamp 48, ceramic resistance 24, lead 31 to the anchored end 32 of bimetallic spiral 12, through spiral 12, to contacts 33, 34 to primary coil 27 of transformer 28 and finally to main 25.

Primary coil 27 serves to impart current to a low voltage secondary coil 36 to energize a solenoid 37 and thus open valve 11. Of course it is to be understood that the energization of solenoid 37 can take place only when the above described circuit is closed. To close this circuit, it is essential that both the ceramic resistance 24 and the thermostat 12 operate to permit the flow of current therethrough. This is accomplished in a manner now to be described.

The pilot burner 19 is lighted, and the flame issuing therefrom plays over the ceramic resistance and causes it to become a conductor. Upon cooling of the room, spiral 12 expands to bring contacts 33, 34 together to close the circuit. This causes the current to flow from the source through the ceramic resistance 24 and the transformer 28 to energize the solenoid 37. This solenoid then attracts valve arm 38 to open valve 11 against the action of spring 39.

Upon heating of the room to the predetermined temperature, spiral 12 contracts and causes a separation of contacts 33, 34 to break the circuit. This deenergizes solenoid 27 and permits spring 39 to exert an upward force on arm 38 to close valve 11. The spring is shown as secured to a rigid support 40. It is now clearly apparent from the foregoing that no passage of gas to the burner can occur unless this control circuit is closed. This assures the ignition of the gas simultaneously with its entry into the burner as the circuit can be closed only when the pilot flame plays over the ceramic resistance 24.

The flow of gas to the pilot burner 19 can also be optionally controlled by an electric circuit which includes the ceramic resistance 24. This circuit is closed only when the ceramic resistance 24 is heated to red heat, and may be traced as follows.

Current from the main 35 flows through lead 26, pilot lamp 48, ceramic resistance 24, leads 31 and 42; through solenoid 43; and finally to main 25. This circuit electrically controls the operation of valve 23 in a manner similar to that described in relation to valve 11.

This circuit is normally open due to the non-conducting resistance 24. To close it, it is simply necessary to apply a lighted match to the resistance 24 to bring it to red heat. This permits the flow of electricity therethrough to energize solenoid 43. The energized solenoid attracts valve arm 45 against the action of spring 46 to open valve 23 and permit the flow of gas therethrough. The lighted match then ignites the gas issuing from orifice 20. Spring 46 is shown as being secured to a rigid support 47.

As before, if for any reason the pilot flame is extinguished, the ceramic resistance 24 immediately cools and reverts to its normal non-conducting condition to break the circuit. The solenoid 43 becomes deenergized, and spring 46 then acts on arm 45 to close valve 23.

As an added precaution, the pilot lamp 48 is provided for indicating whether or not the burners 19 and 10 respectively are burning. This has been accomplished in the form shown by the insertion of lamp 48 in series with the resistance 24. When both valves 11 and 23 are active, the pilot 48 is bright; when only one is active, the pilot 48 is dim; when neither valve is active, lamp 48 is dark.

The means for indicating whether or not the burner 10 is burning, is independent of lamp 48 as hereinabove set out. This means comprises a ceramic resistance 51, similar to resistance 24, which is maintained slightly above the burner 10 as by supports 52. A lamp 53 in series with resistance 51 is included in the following circuit. Current from main 35 flows through lead 26, element 51, lamp 53, lead 54, back to main 25.

The ceramic resistance 24 or 51 is shown in enlarged form in Fig. 5. It can be formed of any material having the peculiar physical property that, when heated from ordinary room temperature to red or cherry heat, it changes from an electrical insulator to an electric conductor. Experimentation has shown that any ceramic material such as porcelain or glass is suitable for this purpose; however, this invention is not limited to these materials, and it is within the scope of this invention to include all materials having like or similar properties; and especially such that there is a critical and sudden resistance variation when a definite temperature is reached.

The ceramic resistance 24 shown in Fig. 5 is shown with leads 57 embedded in the bulbous end portions 58. This resistance can be given any desired form, as is clearly evident from Figs. 5–8.

In Figs. 6 and 7 is shown an advantageous design which utilizes a very short path for the electric current. Spaced terminals 59, 60 are connected to a thin disc of ceramic material 62 between the upper disc shaped portions 61 of the terminals.

In Fig. 8 there is shown an inner terminal 63 surrounded by an outer terminal 64. The active ceramic material 65 maintains these terminals in a spaced apart relationship. This form of construction is very desirable, as in this form it is impossible to cause an external short circuit between the terminals 63 and 64 which would prevent the functioning of the ceramic material in the manner specified.

This invention is not only applicable to electrically operated valves, but is equally applicable to mechanically operated valves, such as are operated by hand or water pressure as in gas water heaters. This form of the invention is clearly shown in Figs. 2–4. As it is similar in all respects to the form shown in Fig. 1 with the exception of the mechanically operated main gas valve 66, and mode of operation thereof, the parts will be briefly referred to. It will also be understood that the circuits, and the details of design and construction of the parts are the same with the omission, in this instance, of the transformer 28. As the transformer was merely a simple expedient to reduce the voltage on the solenoid 37, it is readily apparent, that the omission thereof would have no effect on the circuits other than the omission of its function. In the form of the invention shown in Figs. 2–4, it is assumed that the potential of the source can be directly applied to solenoid 75 without bad effects.

Thus there is shown a burner 67 and a pilot burner 68 controlled by valves 66 and 69 respectively. Valve 69 can be opened as before by the energization of solenoid 70 acting on valve arm 71 against spring action 72. A ceramic resistance 73, normally maintaining the circuit open, is positioned in front of burner 68 as before, whereby a flame issuing therefrom will play over the resistance to bring it to red heat and thereby close the circuit. The resistance 73 acts in conjunction with the thermostat 74 in response to temperature variations to control the circuit for energizing or deenergizing solenoid 75. Lamps 76 and 77 are used, as before, to indicate whether or not the burners 67 and 68 respectively, are burning.

Main valve 66 is normally maintained in a closed position to prevent the flow of gas to burner 67 as by the interaction of pawl 78 with teeth 79 on the sector shaped valve arm 80. Pawl 78 is shown as hinged at its upper extremity to a stationary support 81. This pawl maintains its active locking position even if the valve operating mechanism is actuated by hand. It is only when the pawl 78 is unlocked, that the gas can flow into the burner 67. This unlocking can only take place when the pilot flame plays over the ceramic resistance 73 to bring it to red heat. The mechanism for assuring that valve 66 will not open until resistance 73 is heated, even though the mechanical turning on is accomplished, is clearly shown in Figs. 2–4.

In Fig. 2, the valve 66 is shown in its normally locked position, and it can be opened only by pushing valve arm 80 downwardly. This can be accomplished by moving rod 82 downwardly by first disengaging pawl 78 from teeth 79. However, valve arm 80 can be urged as by a spring 83 to open valve 66 when resistance 73 permits the flow of current therethrough to energize solenoid 75 and attract pawl 78 out of locking engagement.

Spring 83 is disposed around rod 82 and is confined between cup shaped members 84 and 85. A nut 86 is screw-threaded onto rod 82, and maintains spring 83 between predetermined limits. This spring can be compressed to exert a downward force on valve arm 80, as by manually pushing upwards on arm 87 to the position shown in Fig. 3. Arm 87 is pivoted as at 88 at an intermediate point, and is provided at one end with a slot 89. This slot embraces rod 82 and in this manner permits the relative movement of arm 87 with respect to rod 82. The upward movement of this end of arm 87 is also limited by nut 86, and as shown in Figs. 2–4, it is positioned between nut 86 and confining member 84 so that spring 83 can be compressed when the free end of arm 87 is pushed upwardly about pivot 88. The relative position of the parts are shown in Fig. 3 when spring 83 is compressed in the manner described.

Viewing the invention from Fig. 3, it will be seen that all of the mechanical turning on motions have been effectuated without actually turning on valve 66. This valve can be opened only when pawl 78 is unlocked. This can only take place when the pilot 68 is burning to heat resistance 73, and thermostat 74 operates to close the circuit in a manner already described. This causes an energization of solenoid 75 which attracts pawl 78 to unlock valve 66 and permit spring 83 to expand and force valve arm 80 downwardly to open the valve. The position of the parts when valve 66 is open is shown in Fig. 4.

To close valve 66, it is simply necessary to reverse the direction of movement on arm 87. When solenoid 76 becomes deenergized either from the turning off of pilot 68 or the breaking of the circuit by thermostat 74, pawl 78 is released and swings into engaging position with teeth 79.

Although I have shown and described one specific form of valve locking device, my invention is not to be construed as limited thereto, as any other mechanical electrically operated locking device can be used with equal advantage.

It is also within the scope of this invention to include an electrically operated valve and valve control such as resistances 24, 51 and 73 without necessitating the use of a pilot burner. In this form of the invention, a lighted match or fagot would be utilized to heat the resistances until they become electrical conductors, and this match would also ignite the gas flowing into the burners. There is thus an assurance that there must be a lighted match at the burner before it can be supplied with fuel.

I claim:

1. In combination, a fuel conduit, a main valve in said conduit, a pilot burner connected to the conduit but independent of the main valve, an auxiliary valve controlling the pilot, and an electric circuit for controlling both of said valves, said circuit being energized from an appropriate source, and including a common portion and a pair of parallel portions in series with the common portion; the common portion having a signal device responsive to current flow, as well as a member substantially non-conducting below red heat and incapable of being retained at a conducting temperature by the control current flowing through it, said member being positioned so as to be heated by the pilot flame when the pilot is active, to a conducting temperature; one of the parallel portions including an electro-responsive device for causing the auxiliary valve to open when the member is heated; the other parallel portion including a temperature responsive switch and an electro-responsive device for causing the main valve to open when the temperature responsive switch is closed and the member is heated.

2. The combination comprising a fuel valve, a burner, a pilot burner independent of the valve for igniting fuel passing through the burner, a member positioned to be heated by the pilot burner and rendered conductive upon being heated, electro-responsive means for opening the fuel valve, said member being in series with a circuit operating said means, a valve for the pilot burner, and second electro-responsive means for opening the pilot burner valve, said member also being in series with a circuit operating said second electro-responsive means, said circuits being independent of one another with the exception of the inclusion of said member in each circuit.

3. The combination defined in claim 2, and a thermostat influenced by the temperature to be controlled, said thermostat being in series with the first named circuit, whereby said first named circuit may be rendered inoperative even when said member is heated.

OTTO A. KNOPP.